UNITED STATES PATENT OFFICE 2,309,937

HYDROXY DERIVATIVES OF SULPHONAL AND ITS HOMOLOGUES

Hans Dietrich, Mannheim-Waldhof, Fritz Johannessohn, Mannheim-Feudenheim, and Erich Rabald and Walter Peris, Mannheim-Waldhof, Germany, assignors to Rare Chemicals, Inc., Nepera Park, N. Y., a corporation of New York No Drawing. Application July 2, 1940,
Serial No. 343,566

3 Claims. (Cl. 260—607)

This invention relates to the process of obtaining hydroxy derivatives of sulphonal and its homologues.

Sulphonal and its homologues are known for a long time as hypnotics. Under its homologues especially those compounds are interesting in which one of the methyl groups or both methyl groups are substituted with other aliphatic residues as for instance ethyl group etc. Of these Trional and Tetronal are the best known.

We have found that by introducing hydroxy groups into these compounds, we can increase their solubility considerably without destroying their hypnotic action. One of the objects of this invention is to produce soluble hypnotics from sulphonal and its homologues. Other objects will be seen from the specification.

The usual way to obtain hydroxy derivatives of known compounds, to exchange substituents, especially halogen substituents, of sulphonal and its homologues with the hydroxyl group, peculiarly does not work. The halogen and other substituents of sulphonal are so strongly bound, that they do not respond to the usual replacement reactions.

According to our invention these hydroxy compounds may be made fairly easily by reacting mercaptans with mono- and dioxyketones or with their esters, as for instance their acetate, benzoate, etc. The hydroxyl groups of these ketones are on different C atoms. After the reaction the obtained mercaptols are oxidized and the acyl groups hydrolyzed off.

As already mentioned these new compounds have the good hypnotic properties of sulphonal and their homologues, but they are very much more soluble in water and lipoids. For instance, monohydroxysulphonal is soluble in water in the proportion of 1:5 and in ether 1:12, while sulphonal is soluble in water in the proportion of 1:500 only and in ether 1:133.

The following examples illustrate the method of preparing some of these compounds:

Example 1

450 grams ethylmercaptan are cooled down to 5° and saturated with hydrochloric acid gas. Then under continuous stirring, and while hydrochloric gas is introduced, 320 grams acetolacetate are added in a thin stream, taking care, that the temperature should not go over 5–10°. When all acetolacetate is in the mixture 50 grams more of ethylmercaptan are added and the stirring is continued for another 15 minutes. The mixture is placed into a separatory funnel, the aqueous layer separated and the hydrochloric acid is removed from the mercaptol by shaking out with water. After drying with calcium chloride the excess ethylmercaptan is distilled off and the residue is fractionated in vacuum. The so obtained acetolacetatediethylmercaptol boils at 130–131°/13 mm. Yield 568 grams, 94% of theory.

For oxydation 750 grams acetolacetatediethylmercaptol are dissolved in 750 ccs. glacial acetic acid and under continuous stirring 40 liters of a 5% solution of potassium permanganate are added in a thin stream. During this process the temperature of the mixture is kept under 15° by cooling. After the oxidation is finished, the separated managanese dioxide is reduced by introduction of $SO_2$ and the acetoxysulphonal is extracted with methylenechloride. The methylenechloride solution is now shaken out with dilute alkali to remove the acid and evaporated to dryness. The residue is recrystallized out of methanol. Yield 750 grams. Melting point 103–110 C.

350 grams of the so obtained acetoxysulphonal is placed into 1000 ccs. methanol containing 1% HCl and refluxed for 30 minutes and then evaporated. On the addition of a small quantity of ether, the residue becomes crystalline. The crystalline mass is placed on a suction filter and sucked dry. Yield 285 grams, 95% of theory. For purification this is recrystallized from a benzene-ligroine mixture. M. P. 62–64° C. One part of the substance is soluble in 5 parts of water, and in 12 parts of ether.

The chemical reaction of the process is the following:

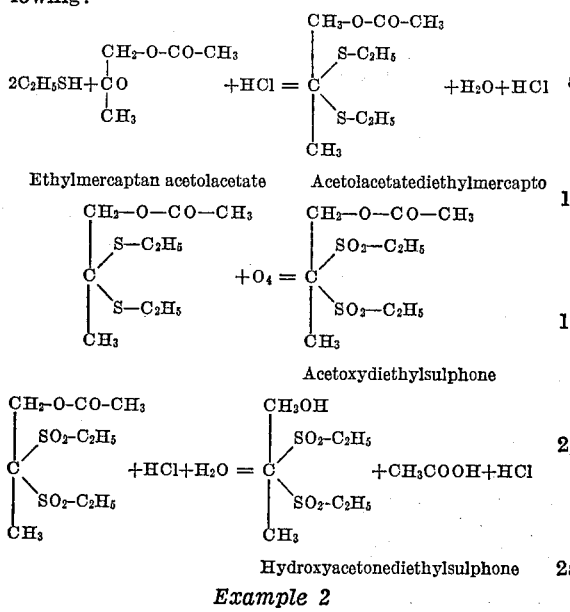

Ethylmercaptan acetolacetate   Acetolacetatediethylmercapto

Acetoxydiethylsulphone

Hydroxyacetonediethylsulphone

*Example 2*

15 grams acetoin (3-hydroxy-2-butanone) are refluxed with 20 grams acetic anhydride for three hours. The mixture is then distilled and the fraction boiling at 161–166° is collected. The yield of acetoin acetate is 12 g. or 54% of the theory.

18 grams ethyl mercaptan are cooled down to 5° and saturated with dry hydrochloric acid gas. Then under continuous stirring, 12 grams acetoin acetate are slowly added, taking care that the temperature should be below 10°. After the addition of the acetoin acetate, five grams more of the ethyl mercaptan are added to the reaction mixture. An hour later the mixture is transferred to a separatory funnel, the aqueous layer separated and the hydrochloric acid is removed from the mercaptol by shaking out with water. The oily layer is dried with calcium chloride, and then the excess ethyl mercaptan is distilled off. The residue is fractionated in vacuum. B. P. 131–133° at 11 mm. The yield of acetoin-acetatediethylmercaptol is 15 grams, or 69% of the theory.

5 grams acetoin acetate diethylmercaptol are added to 9 gms. glacial acetic acid, and under continuous stirring 250 grams of a 5% solution of potassium permanganate are added in a thin stream. The temperature during the oxidation was kept under 15° by cooling. After the oxidation was finished, the excess potassium permanganate is reduced by the addition of sodium bisulphite and the mixture is extracted with ether. The ether solution was shaken out with alkali to remove the acid, and then evaporated on the steam bath. Upon cooling the residue, acetoin acetate diethylsulphone crystallized out which was collected and recrystallized from methanol. M. P. 128–138°. Amount 1.5 g. or 83–84% of the theory. 4 grams of unreacted acetoin acetate diethylmercaptol was recovered from the residue.

1 gram acetoin acetate diethylsulphone was dissolved in 2 cc. of methanol and refluxed for 15 minutes with 3 ccs. of 2N potassium methylalcoholate. The excess alkali is neutralized with dilute hydrochloric acid and evaporated to dryness. The residue is taken up in ether, filtered, boiled up with charcoal and filtered again. The filtrate was evaporated to a small volume and ligroine was added. On cooling acetoin diethylsulphone crystallized out. The substance was recrystallized out of ether and ligroine. M. P. 72–74°. The chemical reaction of the process is the following:

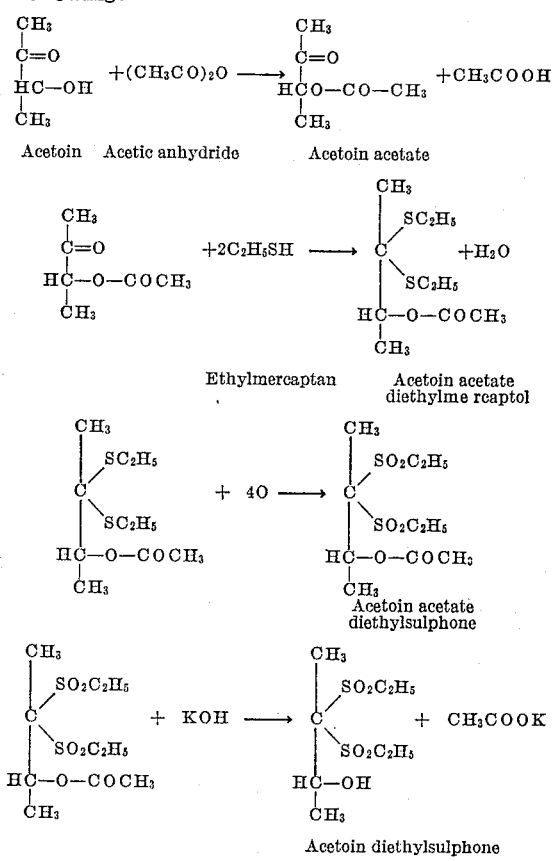

Acetoin   Acetic anhydride   Acetoin acetate

Ethylmercaptan   Acetoin acetate diethylmercaptol

Acetoin acetate diethylsulphone

Acetoin diethylsulphone

*Example 3*

50 grams 1-chloro 2-butanone and 77 grams anhydrous sodium acetate were added to 100 grams glacial acetic acid and refluxed for 7 hours. After cooling it was extracted with benzene. The benzene extract was filtered and the benzene and acetic acid distilled off. The 1-acetoxy butanone (2) was distilled and the fraction which boils at 176–183° collected. Yield 30 grams or 49% of the theory.

45 grams of ethylmercaptan was cooled down to 5° and saturated with dry hydrochloric acid gas. Then under continuous stirring and while hydrochloric acid gas was introduced, 30 grams of 1-acetoxy-butanone(2) were added slowly. During this operation the temperature was kept below 10°. After the addition was completed, 12 more grams of ethylmercaptan was added to the reaction mixture. After standing an hour the mixture was transferred to a separatory funnel, the aqueous layer discarded, and the oily substance is dried with calcium chloride. The excess diethylmercaptan was distilled off the filtered oil and the residue fractionated in vacuum. The 1-acetoxy butanone(2) diethylmercaptol boiling at 137–139° at 12 mm was collected. Yield 36 gms., or 66% of the theory.

35 grams of 1-acetoxy-butanone(2) diethylmercaptol were dissolved in 63 grams of glacial acetic acid and oxidized with a 5% solution of potassium permanganate. 1820 grams of this solution was added in a thin stream under continuous stirring and cooling below 15°. After the oxidation was finished the excess potassium permanganate was reduced by the addition of sodium bisulfite and the mixture extracted with ether. The ether solution was shaken out with alkali to remove the acid and evaporated on the steam bath to a small volume. After cooling the residue the 1-acetoxy-butanone(2)-diethylsulphone crystallizes out, which was collected on a filter and recrystallized from methanol, M. P. 99–101°. Yield 10 grams. The unreacted 1-acetoxy-butanone(2) weighed 10 grams.

9 grams of 1-acetoxy-butanone(2) diethylsulphone in 27 ccs. methanol were refluxed 15 minutes with 18 ccs. of 2N potassium methylalcoholate. The excess alkali was neutralized with hydrochloric acid and evaporated to dryness. The residue was dissolved in ether, filtered, treated with charcoal and evaporated to a small volume. On the addition of ligroine and cooling 1-hydroxybutanone(2) diethylsulphone crystallizes out. This was purified by recrystallization from ether-ligroine, M. P. 76–77°. Yield 5 grams, or 86% of theory.

The chemical reaction of the process is the following:

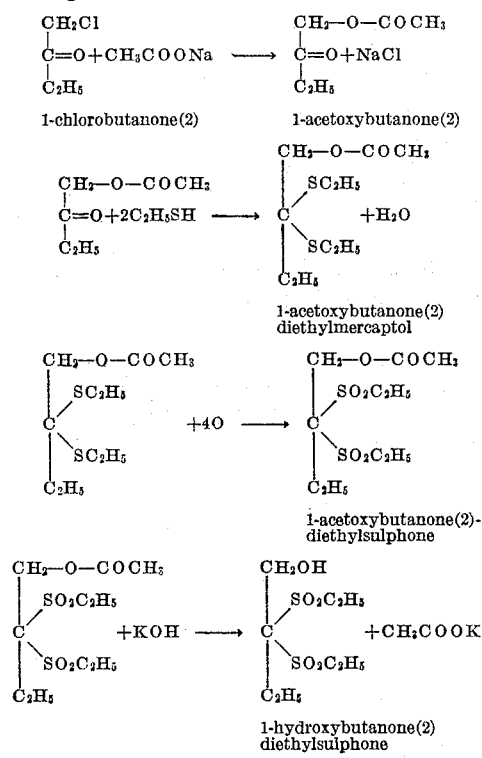

*Example 4*

150 grams α-bromodiethylketon, 115 grams anhydrous sodium acetate and 185 ccs. glacial acetic acid are refluxed for 6 hours at 100–110° C. After cooling water is added and extracted with benzene, the benzene is distilled off and the residue fractionated in vacuum. The yield of α-acetoxy-diethylketon is 105 grams, 82% of theory. B. P. 75–83° at 15 mm.

84 grams of this material are added now to 110 grams with HCl saturated ethyl-mercaptan previously cooled with ice. After all the α-acetoxy-diethylketon is in the mixture 40 grams more of the mercaptan is added, and worked up as in Example 1. The boiling point of the α-acetoxy-diethylketon-diethylmercaptol is 153–155° C. at 17 mm. Yield 138 grams, 95% of theory.

60 grams of this α-acetoxydiethylketon-diethyl-mercaptol are added to 500 ccs. acetone and 100 ccs. glacial acetic acid. The mixture is cooled under continuous stirring to 15–20° C. and oxidized with 2100 ccs. of a 5% potassium permanganate solution. The isolation of the acetylated disulphone is done according to Example 1. The so obtained α-acetoxy-diethylketon-diethylsulphone is recrystallized out of a mixture of water-methanol, or ether-ligroine. M. P. 80–82°.

A solution of 10 grams α-acetoxy-diethylketon-diethylsulphone in 20 ccs. methanol are refluxed for 15 minutes with 32 ccs. 2/N potassium methylalcoholate. Then the excess alkali is neutralized with dilute hydrochloric acid and evaporated to dryness. The residue is dissolved in ether, the insoluble potassium chloride is filtered off, and concentrated to a small volume. On the addition of a little ligroine the α-hydroxy-diethylketon-diethylsulphone crystallizes out. The melting point of the pure compound is about 79° C. One part is soluble in 80 parts of water.

The saponification may take place in acid solution also, as in Example 1. In that case 10 grams of the α-acetoxy-diethylketon-diethylsulphone are refluxed for 3 hours in 150–200 ccs. of methanol in which hydrochloric acid is dissolved. It is advisable to introduce HCl gas into the mixture during the refluxing operation.

The chemical reaction of the process is the following:

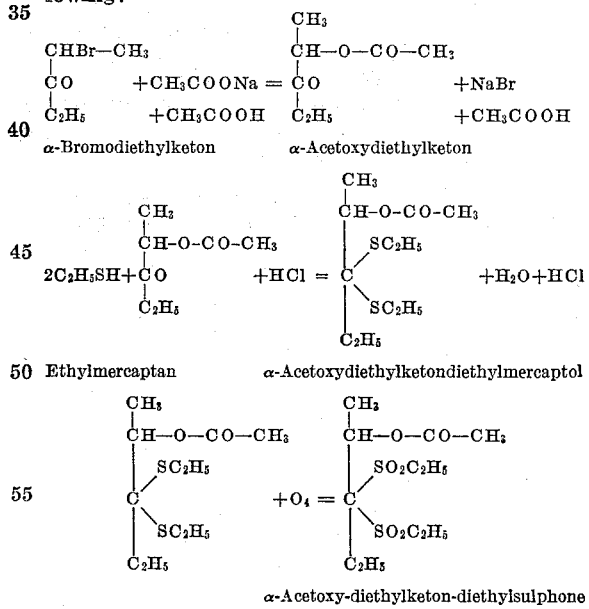

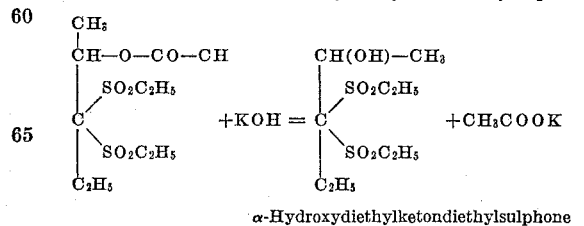

The products obtained as described in the examples are of similar character. They are easily soluble in water, alcohol, acetone, ether, chloroform, methylenechloride and benzene, slightly soluble in ligroine. They are odorless, occur in white crystalline form, and have a bitter taste.

They reduce Fehling's solution, when heated with same.

As already mentioned these new compounds are valuable as therapeutic agents. They may be dispensed in segregated doses in forms of capsules and tablets, or being very soluble, they may be dispensed in liquids, elixirs, etc. We do not limit ourselves to the specifically mentioned times, temperatures, quantities, chemicals or steps of procedure as these are given simply to clearly describe our invention as set forth in our specification and claims, and may be varied without going beyond the scope of our invention.

What we claim is:

1. The method of obtaining compounds having the general formula:

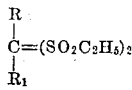

in which R is a member of the group consisting of $CH_3$ and $C_2H_5$ and $R_1$ is a member of the group consisting of $CH_2OH$ and $CH(OH)CH_3$, by reacting ethyl-mercaptan with acetic acid esters of mono-hydroxy ketones, oxidizing the obtained mercaptols and hydrolyzing off the acyl group from the esterfied OH group.

2. The process of producing hydroxyacetondiethylsulphone having the formula $$CH_3C(SO_2C_2H_5)_2CH_2OH$$

comprising the steps of condensing acetolacetate with ethylmercaptan under acid conditions, oxidizing the thus formed acetolacetate-diethylmercaptol to acetolacetate-diethylsulphone by means of potassium permanganate solution, hydrolyzing off the acetyl group and recrystallizing the thus produced product.

3. The process of producing acetoindiethylsulphone having the formula $$CH_3C(SO_2C_2H_5)_2CHOHCH_3$$

comprising the steps of condensing acetoinacetate with ethylmercaptan under acid conditions, oxidizing the thus produced acetoinacetatediethylmercaptol to acetoinacetatediethylsulphone by means of potassium permanganate, hydrolyzing off the acetyl group and recrystallizing the thus produced product.

4. The process of producing hydroxybutanonediethylsulphone having the formula $$C_2H_5C(SO_2C_2H_5)_2CH_2OH$$

comprising the steps of condensing 1-acetoxybutanone(2) with ethylmercaptan under acid conditions, oxidizing the thus produced 1-acetoxybutanone(2)diethylmercaptol to 1-acetoxybutanone(2)diethylsulphone by means of potassium permanganate, hydrolyzing off the acetyl group and recrystallizing the thus produced product.

5. A new chemical compound, hydroxyacetonediethylsulphone, a white crystalline powder having the formula $CH_3C(SO_2C_2H_5)_2CH_2OH$.

6. A new chemical compound, acetoindiethylsulphone having the formula $$CH_3C(SO_2C_2H_5)_2CHOHCH_3$$

7. A new chemical compound, hydroxybutanonediethylsulphone having the formula $$C_2H_5C(SO_2C_2H_5)_2CH_2OH$$

8. New chemical compounds having the general formula:

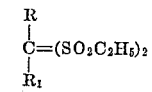

in which R is a member of the group consisting of $CH_3$ and $C_2H_5$ and $R_1$ is a member of the group consisting of $CH_2OH$ and $CH(OH)CH_3$ which are white crystalline substances easily soluble in water, alcohol, chloroform, methylene chloride, benzene and slightly soluble in ligroine.

HANS DIETRICH.
FRITZ JOHANNESSOHN.
ERICH RABALD.
WALTER PERIS.